United States Patent [19]

Dilley

[11] Patent Number: 5,679,925
[45] Date of Patent: Oct. 21, 1997

[54] HOME ELECTRICAL OUTLET/ RETRACTABLE EXTENSION CORD

[76] Inventor: Glen R. Dilley, P.O. Box 7843, Chico, Calif. 95927

[21] Appl. No.: 703,049

[22] Filed: Aug. 26, 1996

[51] Int. Cl.⁶ ........................... H01H 9/02
[52] U.S. Cl. .................... 174/53; 242/397
[58] Field of Search ............... 242/389, 397, 242/398; 439/501; 74/53, 57, 48, 50, 69; 220/3.3, 3.7

[56] References Cited

U.S. PATENT DOCUMENTS

| | | | |
|---|---|---|---|
| 2,521,226 | 9/1950 | Keller | 439/501 X |
| 2,856,470 | 10/1958 | Hyde | 191/12.4 |
| 3,815,078 | 6/1974 | Fedrick | 439/581 |
| 4,232,837 | 11/1980 | Cutler et al. | 242/107 |
| 4,467,979 | 8/1984 | Koehlor | 242/396.1 |
| 4,969,610 | 11/1990 | Taylor et al. | 242/371 |

*Primary Examiner*—Hyung S. Sough
*Assistant Examiner*—Dhiru R. Patel

[57] ABSTRACT

An electrical junction box has internal mechanics allowing at least one receptacle to be pulled out as an extension cord. The cord unwinds and rewinds on a spool inside the junction box. A return spring and a releasable ratchet allows the cord to be stopped by the user at various lengths either when pulling the receptacle from the junction box or returning it to the box. The junction box can be use in residential homes, commercial buildings, offices, school rooms, and other structures as a standard 110 volt electrical outlet and self-contained extension cord.

7 Claims, 4 Drawing Sheets

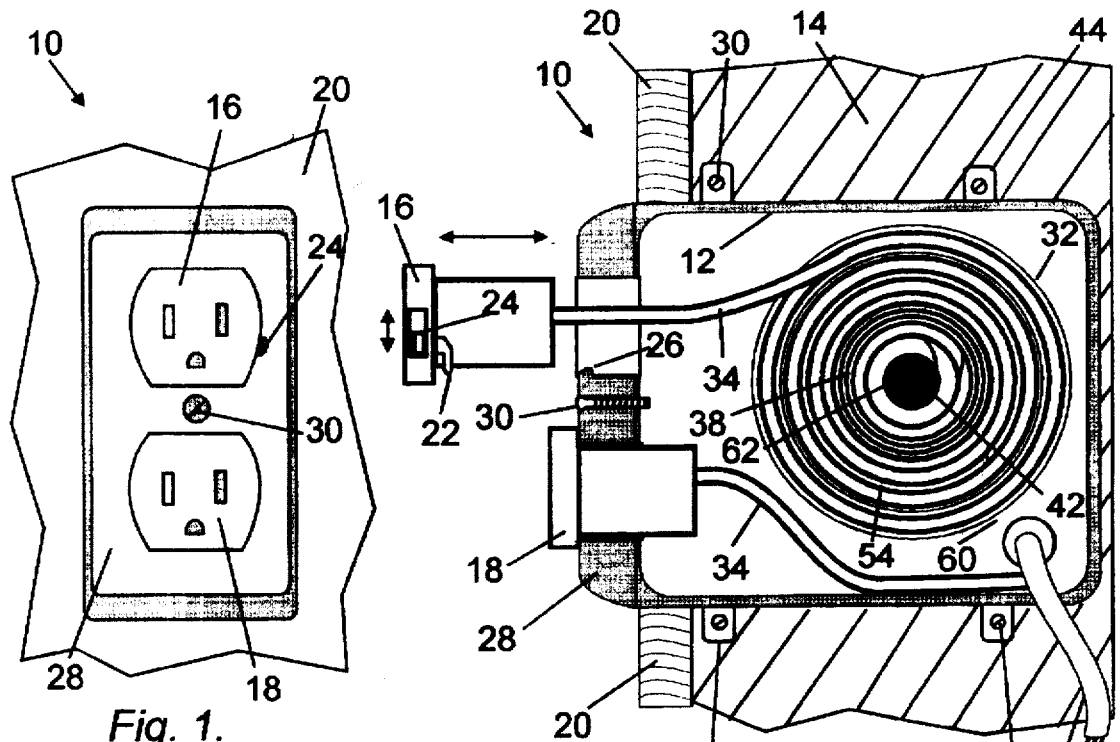
Fig. 1.
Fig. 2.
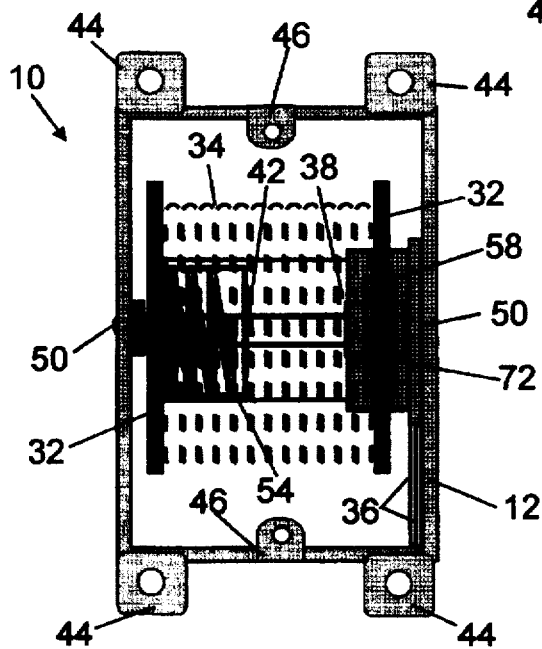
Fig. 3.

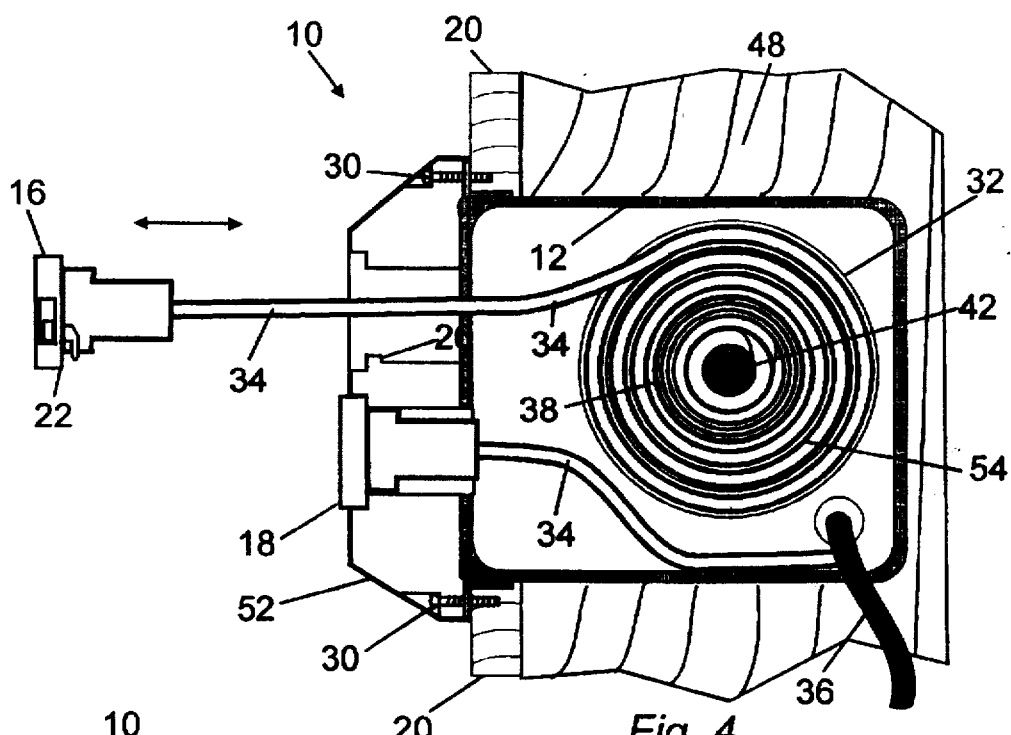
Fig. 4.
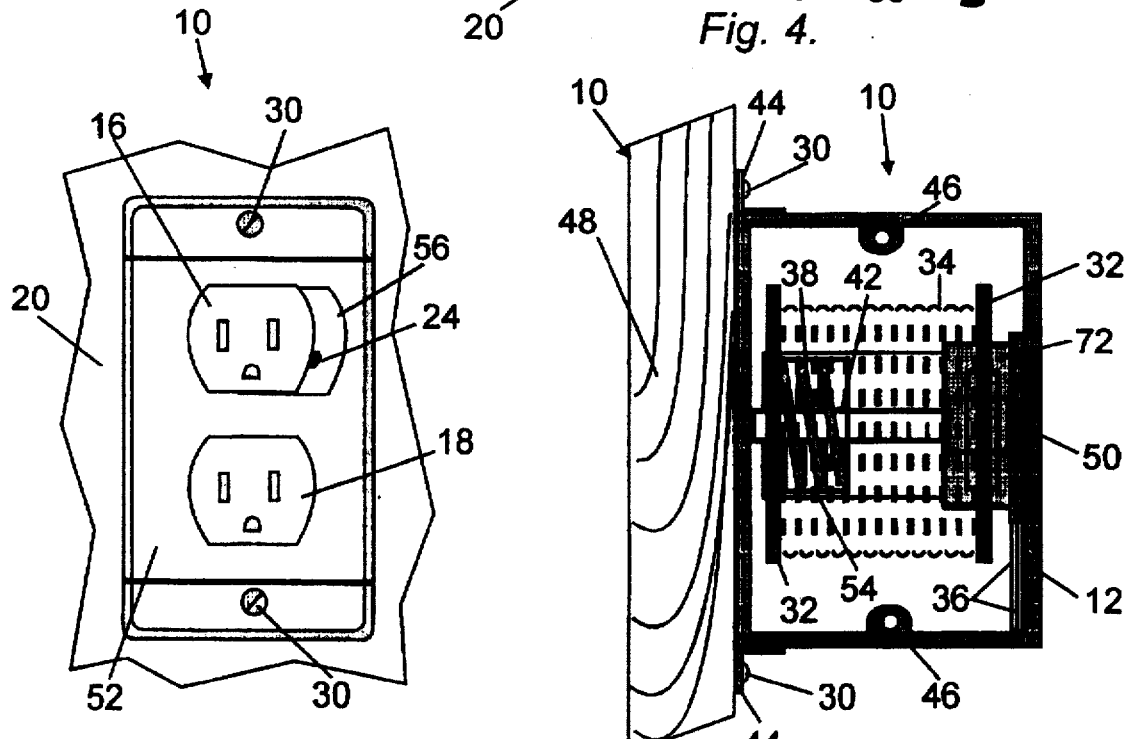
Fig. 5.
Fig. 6.

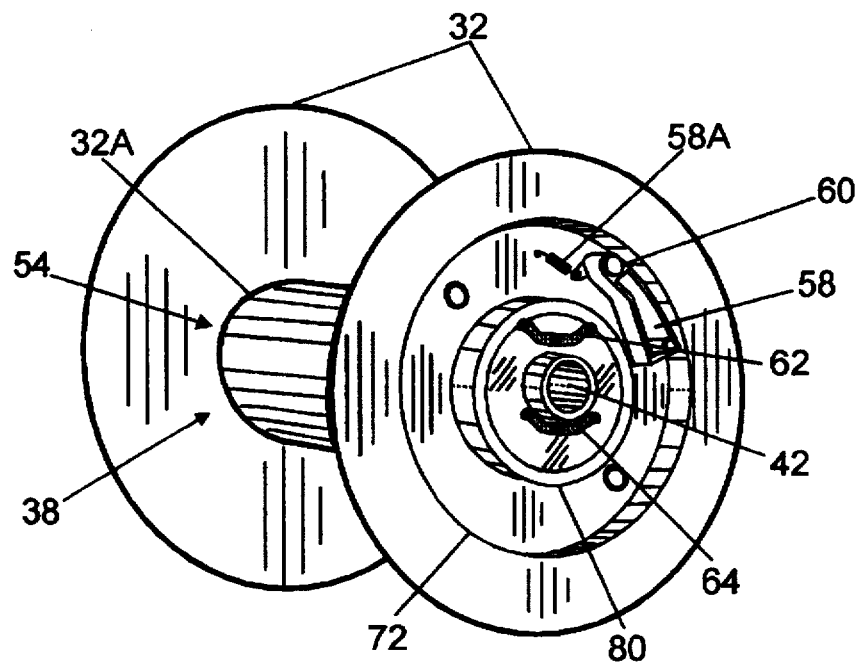
*Fig. 7.*
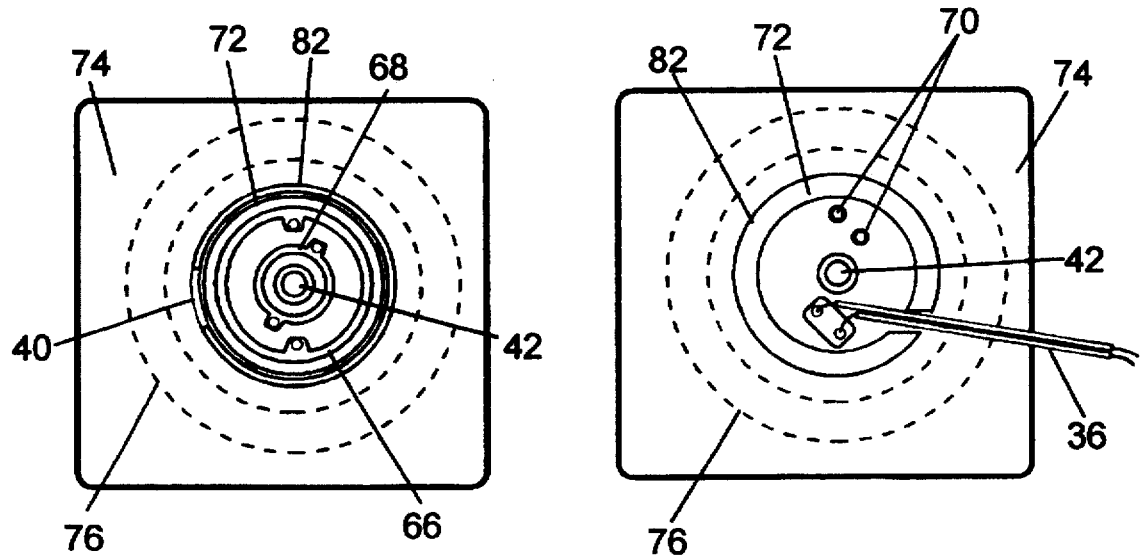
*Fig. 8.*  *Fig. 9.* ered cord. The present invention is particularly directed towards
HOME ELECTRICAL OUTLET/ RETRACTABLE EXTENSION CORD

BACKGROUND OF THE INVENTION

1. Field of the Invention

This invention relates to electrical junction boxes having at least one pull-out receptacle affixed with an extension cord. The present invention is particularly directed towards an extendible electrical receptacle having an attached cord arranged to be manually uncoiled from a reel and to automatically recoil to the same reel, the reel being inside the electrical junction box.

2. Description of the Prior Art

Although many types of housed reel extension cords with plug-in ends are seen in past art patents and are available in the market place, devices directly similar to the present invention appear to be unpublished in patents and unavailable in the market place.

SUMMARY OF THE INVENTION

Therefore, in practicing my invention, I provide an electrical junction box with internal mechanics that allows at least one receptacle to be pulled out as an extension cord. The cord unwinds and rewinds on a spool inside the junction box. A coil return spring and a releasable ratchet allows the cord to be stopped by the user at various lengths either when pulling the receptacle from the junction box or returning it to the box. My device is designed for use in residential homes, commercial buildings, offices, school rooms, and other structures as a standard 110 volt electrical outlet and self-contained extension cord. The junction box housing the spool and coiled wire is similar to a standard electrical outlet box and can be used in any interior and exterior walls framed with standard 2×4's (or larger), steel or wood stud construction. Punch-out tabs for electric input wire attachment are on the side and back of the junction box. Although the cover plate of the present invention is convex and has special receptacle apertures, it fastens to the box by the standard screw method currently used.

As a principal object, the present invention provides a 110 volt electrical junction box having at least one receptacle that can be pulled out and used as an extension cord.

Another object of the invention is to provide a 110 volt electrical junction box with a receptacle affixed as an extension cord, the cord unwinding and automatically rewinding on a spring-loaded spool inside the junction box.

A further object of my invention is to provide an extension cord on a spool housed in a 110 volt junction box with the spool having a return spring and a releasable ratchet allowing the cord to be stopped by the user at various lengths either when pulling the receptacle from the junction box or returning it to the box.

A still further object of the invention is to provide a removable receptacle as an extension cord in part with a 110 volt junction box, the receptacle being of a standard size or a block size fitting a crosswise cutout in a beveled or extended front cover plate there being a releasable snap lock holding the receptacle in the cover plate.

Other objects and the many advantages of the present invention will become apparent from reading descriptions of numbered parts in the specification and comparing them with like numbered parts shown in the included drawings.

BRIEF DESCRIPTION OF THE DRAWINGS

In the drawings:

FIG. 1 shows a frontal view of an electrical cover plate in accordance with the invention. The upper receptacle is removable and can be used as an extension cord. A spring latch release is visible on one side of the upper receptacle. The lower receptacle is fixed.

FIG. 2 shows the electrical junction box of this invention in a cutaway side view. The upper receptacle is shown pulled out from the cover. Inside the opened housing, the extension wire can be seen coiled on a spring loaded spool. The junction box is fastened to a metal stud and mounted through a sheet rock wall.

FIG. 3 shows the junction box of this invention in a frontal view with the cover plate removed. The spring and spring housing is in the spool to the left in the illustration. The electrical connections and ratchet housing is to the right. An electric input wire passes through holder fittings affixed through a punch-out tab, lower right in the illustration.

FIG. 4 shows a second embodiment of the invention in a cutaway side view. A block type receptacle shown pulled out is the extension in this embodiment. The cover plate is enlarged and has beveled ends. All internal components are the same as FIG. 1. The junction box is fastened to a wood stud and mounted in an exterior composition wall.

FIG. 5 is a frontal view of the cover plate and receptacles of the block-type pull-out extension cord embodiment.

FIG. 6 shows a frontal view of an opened junction box for the block-type extension plug. The box is shown with side mounting tabs attached to a wood stud.

FIG. 7 shows a perspective view of the wire spool structure in accordance with this invention. The return spring and spring housing (not seen) are in the far end of the spool tube. The electrical connections are contact tabs housed adjacent the spool axle in a recessed area formed in the end of a raised cylindrical center section. A ratchet arm and spring are in a circular recess formed between the raised center section and a collared outer edge. The circular recessed area fits track-like telescoping inside a tubular protrusion formed on the inside surface in the side wall of the junction box.

FIG. 8 shows the inside surface of the side wall of a junction box in accordance with this invention. When assembled, the surface of the wall illustrated would be facing the end of the spool shown in FIG. 7. Outer and inner electrical input rings shown are arranged to contact the receiver tabs on the end of the spool. A tubular protrusion (dotted lines) fits inside the spool collar and provides structure to operate uncoil and recoil mechanics for the spool.

FIG. 9 shows the outside surface of the side wall of FIG. 8. The drawing is see-through so the electrical input connections and spool axle can be seen. These parts are actually the back of the electrical housing shown in FIG. 8 and are against the inside surface of the junction box side wall.

DESCRIPTION OF THE PREFERRED EMBODIMENT

Figure 10:
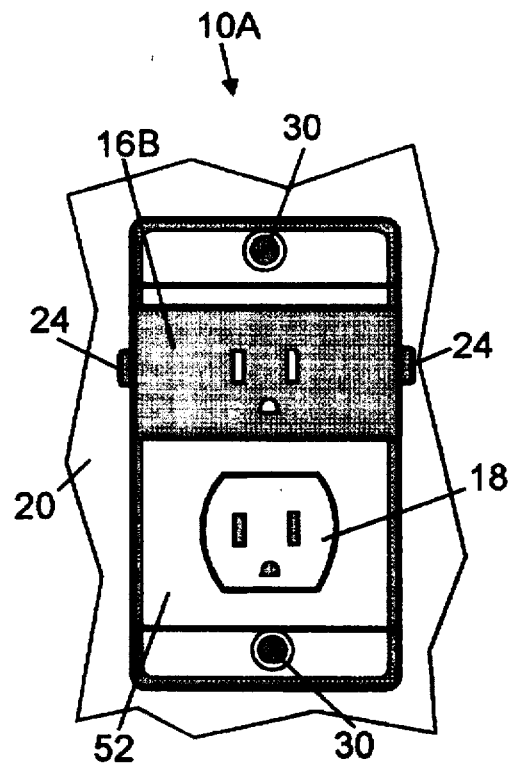
FIG. 10 is a repeat of FIG. 5 to further illustrate the block-type removable extension cord receptacle relative to the cover plate of the invention when the receptacle is snapped in place in the cover plate.

Referring now to the drawings at FIG. 1 where a first embodiment of the invention is referenced as invention 10. Although having a widened cover plate 28, invention 10 is similar to a standard 110 volt household electrical outlet. The numbered parts shown include: extension receptacle 16, fixed receptacle 18, wall section 20 (internal or external), spring latch release 24, cover plate 28, and retainer screw 30. FIG. 2 shows junction box 12 of invention 10 in a cutaway panel side view. Junction box 12 is attached to metal stud 14 by retainer screws 30 through box retainer tabs 44. Cover plate 28 is fastened to box 12 at the front by retainer screw 30. Extension receptacle 16 has been pulled out from extension receptacle socket 16A. Snap latch hook 22 protrudes from the back edge of the widened receptacle 16 head, latch release 24 is on the side, and latch catch 26 is in the bottom surface of extension receptacle socket 16A. Fixed receptacle 18 is in the lower section of cover plate 28. Cover plate 28 is mounted on junction box 12 to protrude somewhat out from wall 20. Wall 20 can be an interior or an exterior wall covering. Wire spool 32 has a hollow spool tube 32A on which outlet wire 34 winds and unwinds. Hollow spool tube 32A has coil spring 38 in spring housing 54 at one end (not shown) and input electrical connections (see FIG. 7) at the other end. A spool axle 42 is centered in wire spool 32. Electrical input wire 36 is in the lower right corner of box 12 passed through punch-out tab 78.

In FIG. 3, junction box 12 is shown in a frontal view with cover plate 28 removed. Spool 32 is supported by axle 42 through the canter attached to the side walls of box 12 by wheel hubs 50. Hollow spool tube 32A has illustrative extension wire 34 coiled on it illustrated in dotted lines. Coil spring housing 54 with coil spring 38 inside is shown to the left in the drawing. Electrical contact and ratchet control housing 72 is to the right in the FIG. 3 drawing. Junction box attachment tabs 44 are on the top and bottom edges of junction box 12, and cover plate attachment tabs 46 are centered top and bottom front of junction box 12. Electric input wire 36 passes through holder fittings affixed through a punch-out tab 76 lower right in the illustration and continue upward inside box 12 to housing 72.

A second embodiment, invention 10A, is illustrated at FIG. 4 in a cutaway side view. Block-type receptacle 16B is shown pulled out from junction box 12 and is the extension receptacle of embodiment 10A. Beveled cover plate 52 is attached to wall 20 and to junction box 12 top and bottom by retainer screws 30. All internal components are the same as FIG. 2. Junction box 12 is shown fastened to wood stud 48 and mounted on wall 20. Wall 20 can be interior or exterior. It is noted that both embodiments 10 and 10A of the present invention can be manufactured of durable plastic and used externally free of any wall surface. In FIG. 5, invention 10A is shown in a frontal view of beveled cover plate 52. Block-type receptacle 16B can be released by spring latch releases 24, on either side and is the block-type pull-out extension cord of embodiment 10A.

FIG. 6 shows junction box 12 of invention 10A in a frontal view with cover plate 52 removed. Junction box 12 is shown with side mounting tabs 44 attached to a wood stud 48 by retainer scows 30. Cover plate attachment tabs 46 are at the top and bottom of junction box 12. Wire 34, in dotted lines, is shown wound on hollow spool tube 32A of wire spool 32. Hollow spool tube 32A has coil spring 38 in spring housing 54 left in the illustration. Input electrical connections (see FIG. 7) are in housing 72 at the right end of spool tube 32A. Spool axle 42 is centered in wire spool 32. Electrical input wire 36 is in the lower right corner of box 12 passed through punch-out tab 76. Wire return ratchet 58, not shown, is also in housing 72. Axle 42 supports wire spool 32 by hubs 50 in the side walls of junction box 12.

A perspective view of wire spool 32 is shown in FIG. 7. Return coil spring 38 is in spring housing 54 in the far end of the spool tube 32A (indicated by arrow and number but not shown). Spool upper input electrical contact tab 62 and lower electric contact tab 64 are housed adjacent spool axle 42 in a recessed area formed in the end of a raised cylindrical center section 80. Ratchet arm 58 pivotal at pin 60 is attached at the upper end to bias spring 58A and is in a circular recess formed between the raised center cylindrical section 80 and the collared outer edge of housing 72. The circular recessed area of housing 72 fits covered inside a tubular protrusion 82 formed on the inside surface of side wall 74. FIG. 8 shows the inside surface of side wall 74 of junction box 12. When assembled, the inside surface of wall 74 would be facing the end of wire spool 32 shown in FIG. 7. Upper electrical input ring 66 and lower electrical input ring 68 are arranged to contact the receiver tabs 62 and 64 on the end of wire spool 32. Tubular protrusion 82 fits mobile around raised cylindrical section 80 inside the spool collar forming housing 72. Ratchet arm 58, clicking through ratchet effect opening 40 operates uncoil and recoil ratchet mechanic on wire spool 32 allowing wire 34 to be intermittently uncoiled and recoiled.

The FIG. 9 drawing shows the outside surface of side wall 74 drawn see-through. Electrical input connections 36, spool axle 42, ground connectors 70, and tubular protrusion 82 can be seen. While FIG. 8 shows the inside surface of wall 74, FIG. 9 shows the outside surface. The parts seen are actually inside junction box 12 manufactured on the inside surface of side wall 74.

Figure 11:
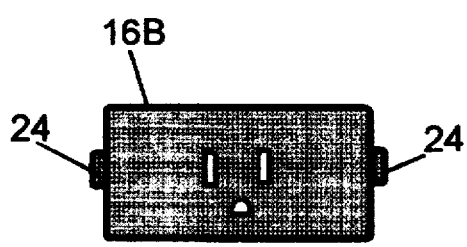
FIG. 11 shows a frontal view of the block-type receptacle removed from the cover plate.
Figure 12:
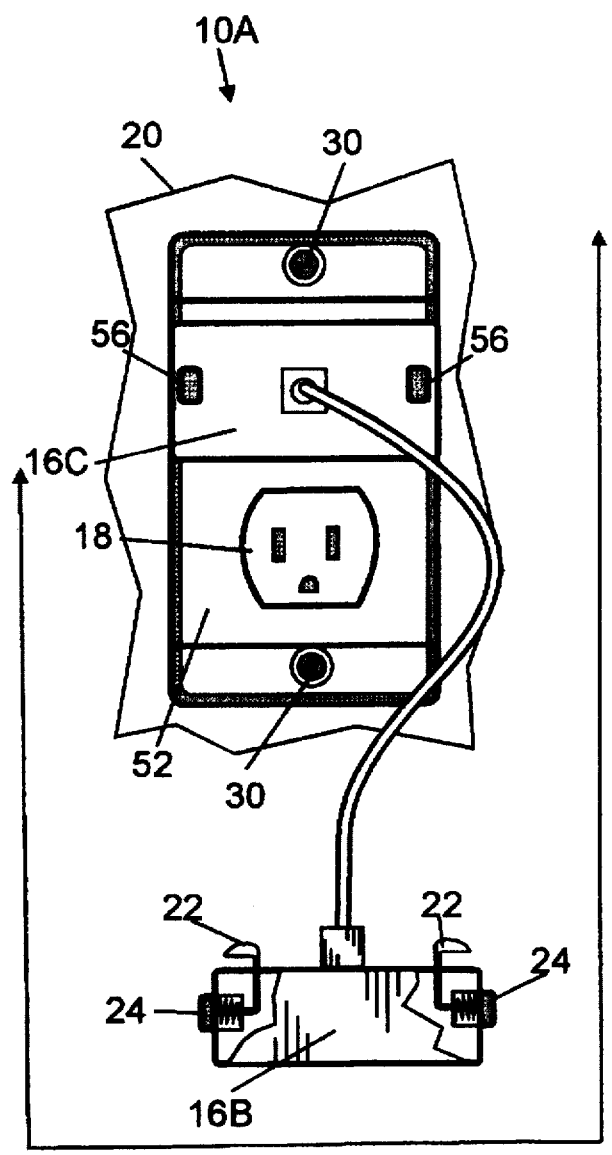
FIG. 12 shows the block type extension receptacle of this invention pulled from the junction box for use. The receptacle is illustrated in a top plan view with the surface covering partly removed at the ends to show the snap spring latch and release buttons. The latch receiver openings are at each end of the extension socket.

FIG. 10 is a repeat of FIG. 5 to further illustrate the block-type removable extension cord receptacle 16B relative to cover plate 52 when the receptacle is snapped into cover plate 52. Latch releases 24 are arranged one on each end of block-type receptacle 61B. FIG. 11 shows a frontal view of block-type receptacle 16B unattached and removed from cover plate 52. FIG. 12 shows block type extension receptacle 16B pulled from junction box 12 for use. Receptacle 16B is shown in a top plan view. The surface covering is partly removed at the ends to show snap spring latches 22 and their relation to spring biased release buttons 24.

For use, both embodiments 10 and 10A have a similar junction box 12. Junction box 12 can be attach as shown in FIG. 2 to a metal stud 14 or to a wood stud 48, shown in FIG. 4. The embodiments, 10 and 10A, provide a 110 electrical wall outlet similar to a standard outlet. A releasable receptacle 16 can be pulled out from junction box 12 in embodiment 10 and used as an extension cord. Cord 34 attached to receptacle 16 unwinds and rewinds on spool 32 inside of junction box 12. Coil spring 38 and releasable ratchet arm 58 clicking through ratchet stop opening 40 allows cord 34 to be stopped by a user at various length either when pulling receptacle 16 from junction box 12 or returning cord 34 to box 12. Embodiment 10A operates in the same manner, the difference being that embodiment 10A is a block-type receptacle 16B, rectangular in shape and fitting crosswise in an opened upper socket 16C in beveled cover plate 52 as shown in FIGS. 10–12.

Although I have described two embodiments according to my invention with considerable details in the foregoing specification and illustrated them extensively in the drawings, it is to be understood that I may make changes in the structure of the devices so long as any changes made remain within the scope of the appended claims and any changed devices similar to mine made by others that fall within my claim scope, I shall consider such devices to be my invention.

What is claimed is:

1. An electrical outlet junction box having at least one removable receptacle affixed to an electrical cord wound on a spool inside said junction box, said receptacle useful to be pulled from said junction box and used as said electrical cord, including:
   a. means for automatic return of said cord to rewind on said spool;
   b. means allowing said cord to be stopped at various lengths either during pull out or during said automatic return of said cord to rewind on said spool;
   c. means for holding said removable receptacle in place when said receptacle is positioned in a receiver socket in a cover plate on said junction box;
   d. means for releasing said removable receptacle from said holding means includes a release lever on said removable receptacle;
   e. means for passing electrical input through said junction box to said cord in said spool; and
   f. means providing electrical input from an electrical source into said junction box.

2. The electrical junction box of claim 1 wherein said means for automatic return of said cord to rewind on said spool includes a coil spring in said spool biased to rewind said cord.

3. The electrical junction box of claim 1 wherein said means allowing said cord to be stopped at various lengths either during pull out or during said automatic return of said cord to rewind on said spool includes a ratchet arm and stop in a housing on one end of said spool.

4. The electrical junction box of claim 1 wherein said means for holding said removable receptacle in place when said receptacle is positioned in said receiver socket in said cover plate on said junction box includes a spring latch.

5. The electrical junction box of claim 1 wherein said means for releasing said removable receptacle from said holding means includes press button releases at both ends of said removable receptacle.

6. The electrical junction box of claim 1 wherein said means for passing electrical input through said junction box to said cord in said spool includes electrical contact tabs on an end of said spool, said tabs internally connected to said cord, said tabs arranged to slide along electrically charged rings in a housing on the inside of an end panel of said junction box.

7. The electrical junction box of claim 1 wherein said means providing electrical input from said electrical source into said junction box includes electrical input wires passed through punch out tabs in said junction box with said wires connected in a manner to charge rings in a housing on the inside of an end panel of said junction box and provide electricity to fixed receptacles in said junction box, said wires attachable to said electrical input source.

* * * * *